United States Patent [19]

Pellettier

[11] Patent Number: 5,236,342

[45] Date of Patent: Aug. 17, 1993

[54] UNIVERSALLY MOUNTED HAND TRUCK HOLDER APPARATUS AND METHOD

[75] Inventor: Roert F. Pellettier, La Crescenta, Calif.

[73] Assignee: McKesson Corporation, San Francisco, Calif.

[21] Appl. No.: 746,918

[22] Filed: Aug. 19, 1991

[51] Int. Cl.$^5$ .............................................. B60R 9/06
[52] U.S. Cl. ......................... 224/42.03 R; 224/42.07; 224/42.43; 224/42.42; 224/42.45 R
[58] Field of Search ................. 224/42.03 R, 42.03 A, 224/42.04, 42.05, 42.07, 42.32, 42.33, 42.38, 42.39, 42.4, 42.42, 42.43, 42.45 R; 296/37.6; 293/117

[56] References Cited

U.S. PATENT DOCUMENTS

| | | | |
|---|---|---|---|
| 1,267,750 | 5/1918 | Eaton | 224/42.4 |
| 1,385,640 | 7/1921 | O'Keefe | 224/42.39 |
| 1,498,715 | 6/1924 | Benoist | 224/42.43 |
| 1,640,779 | 8/1927 | Laher | 224/42.07 |
| 1,897,094 | 2/1933 | Wilson | 224/42.07 |
| 2,476,814 | 7/1949 | Carmack et al. | 293/117 X |
| 2,686,060 | 8/1954 | Couse | 293/117 X |
| 3,203,605 | 8/1965 | Karl | 224/42.07 |
| 3,443,730 | 5/1969 | Meusel | 224/42.03 |
| 4,204,701 | 5/1980 | Oltrogge | 293/117 X |
| 4,867,356 | 9/1989 | Melby | 224/42.03 R |
| 5,096,102 | 3/1992 | Tolson | 224/42.45 R |
| 5,133,489 | 7/1992 | Loew et al. | 224/42.39 |

FOREIGN PATENT DOCUMENTS

| | | | |
|---|---|---|---|
| 0922816 | 6/1947 | France | 224/42.03 R |
| 0152441 | 4/1932 | Switzerland | 224/42.03 A |
| 0384698 | 12/1932 | United Kingdom | 224/42.42 |

Primary Examiner—Henry J. Recla
Assistant Examiner—Casey Jacyna
Attorney, Agent, or Firm—Flehr, Hohbach, Test, Alritton & Herbert

[57] ABSTRACT

A hand truck holder apparatus (40) for releasably securing a hand truck (20) to a vehicle bumper (32) includes a bracket member (48) having a mounting plate (50) and a pair of flanges (52, 54) positioned on opposed sides of the mounting plate (50). Mounting means are coupled to the bracket member (48) for mounting the same to the vehicle and a support member (44) transversely mounted to the pair of flanges (52, 54) supports the hand truck (20) thereon. Moreover, a substantially resilient securing strap (46) is mounted to and transversely spans the bracket member (48), thereby securing the hand truck (20) to the bracket member (48). In another aspect, the mounting means include a plurality of sets of apertures (80) extending therethrough for releasably mounting the bracket member (48) to a plurality of vertical mounting positions relative to the bumper (32). A method of mounting the hand truck holder (40) to the bumper (32) by aligning at least one set of mounting apertures (80) with the at least one set of existing license plate apertures (82) is also described.

12 Claims, 2 Drawing Sheets

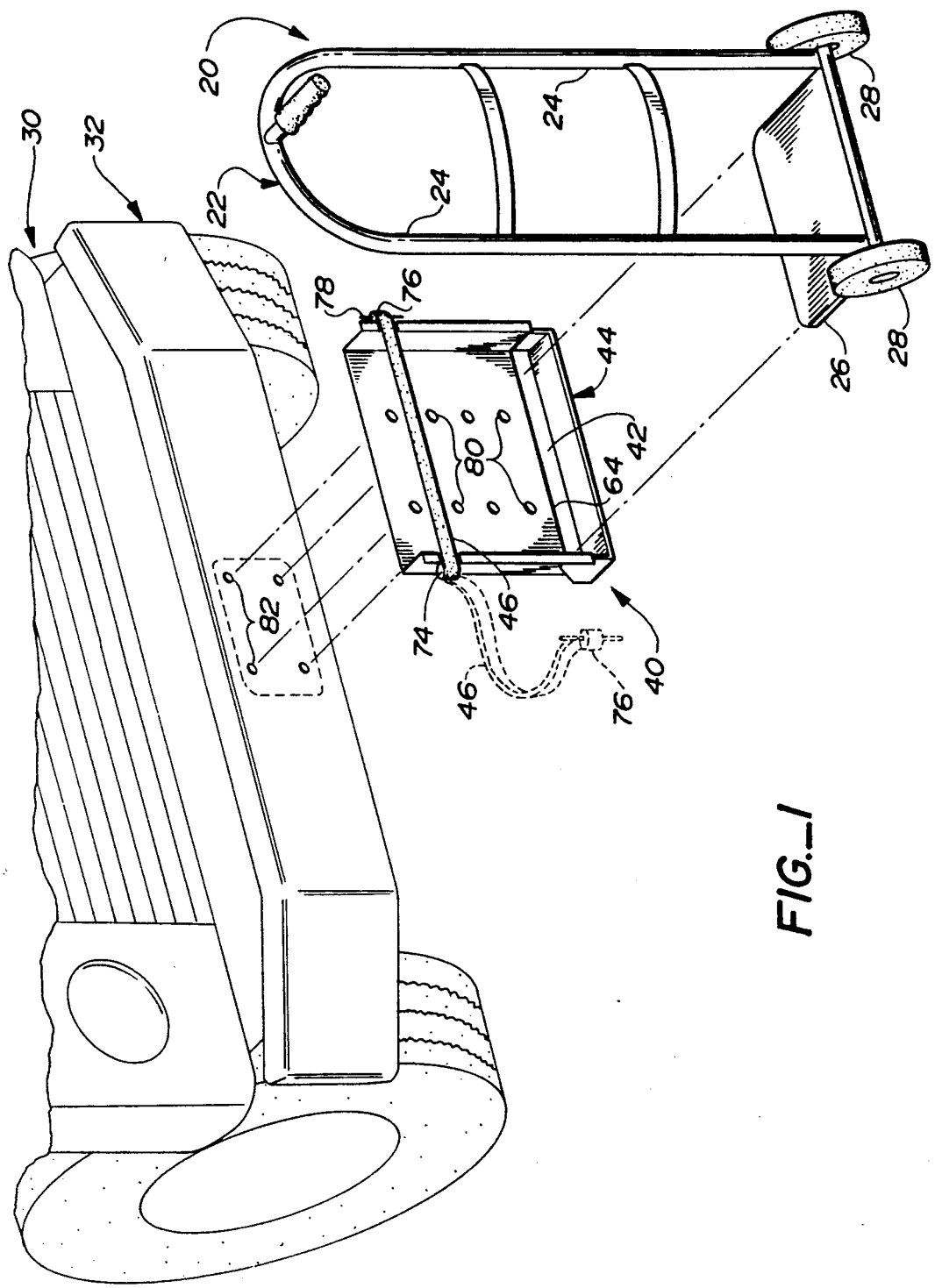
FIG._1

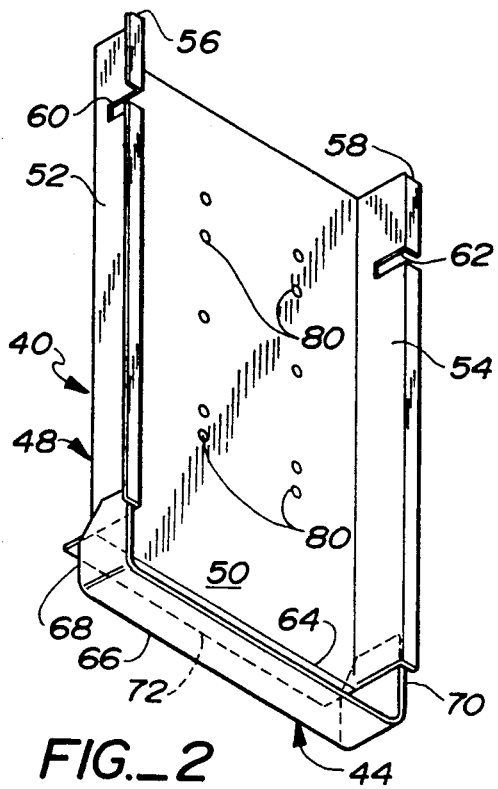
FIG._2
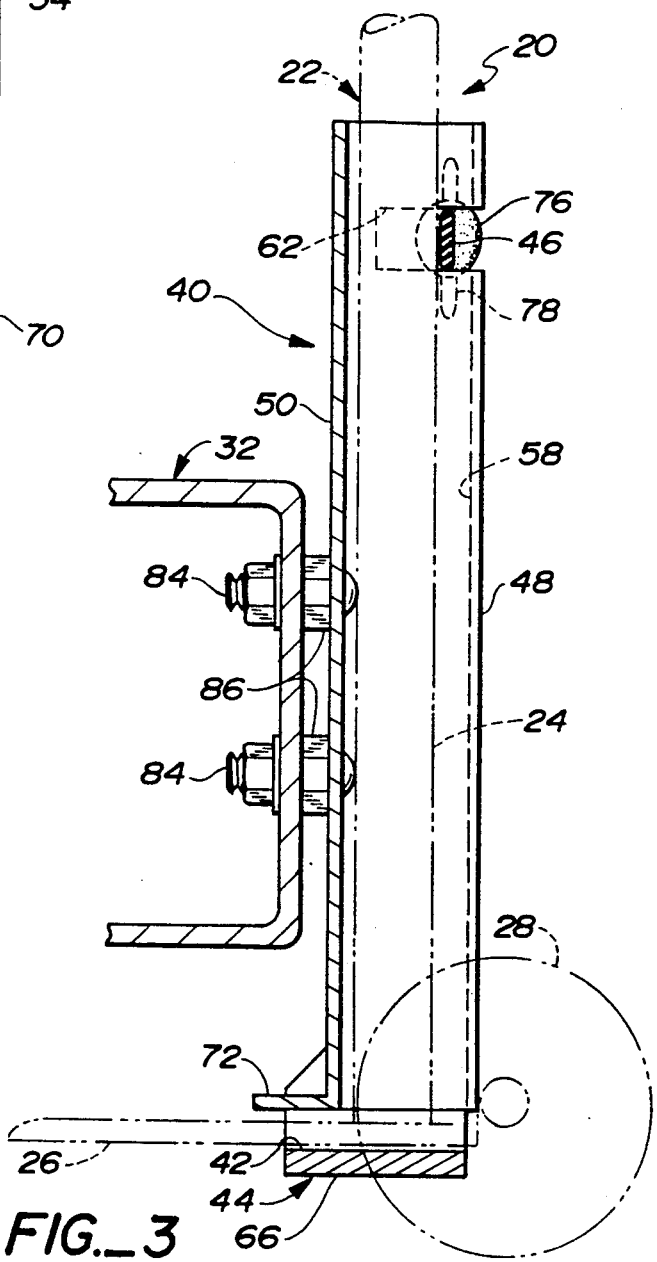
FIG._3

UNIVERSALLY MOUNTED HAND TRUCK HOLDER APPARATUS AND METHOD

BACKGROUND OF THE INVENTION

1. Field of the Invention

The present invention relates to hand truck holders and, more particularly, to hand truck holders releasably mounted to motor vehicles.

2. Description of the Related Art

Hand trucks or "dollies", as they are commonly referred, are widely used to transport heavy or bulky objects over generally short distances. Briefly, hand trucks usually comprise a frame, a lifting platform mounted thereon, at least one handle and a set of wheels or casters for mobility. However, a variety of sizes and designs are available to meet particular needs.

These hand trucks have become an integral part or instrument for delivery personnel. Because of the physical difficulty of moving cargo or because of schedules or other time constraints, the delivery personnel often rely on hand trucks to transport the cargo from the delivery truck to the ultimate delivery destination. Each time, the hand truck must be unloaded from the vehicle to prepare it for transporting cargo. Due to the frequent stops over the course of the day, it thus becomes tiresome for the delivery personnel to constantly load and unload the hand truck into the vehicle. Therefore, it has been found beneficial to mount the hand truck to the exterior of the vehicle where it is much more accessible.

Various hand truck holders for securing a hand truck to the exterior of a delivery truck have been recognized in the past. In particular, these hand truck holders often are designed to mount the hand truck to the rear or front bumper of the delivery vehicle.

One problem usually associated with these prior designs is that these hand truck holders tend to be vehicle-specific. Depending on the make of delivery vehicle and the bumper configuration, the hand truck holders are generally designed for use only in conjunction with that specific vehicle model. These units are often not interchangeable. Mounting a hand truck holder to a vehicle for which it was not designed may result in interference problems which impede the normal operation of the vehicle. For example, the mounted hand truck holder may protrude too high whereby it may interfere with the operation of the hood. Similarly, too low of a positioning relative to the bumper may impede the movement of the vehicle itself. Accordingly, the hand truck holders usually cannot be interchangeably or universally mounted to numerous delivery vehicle models. Another problem associated with the prior art hand truck holders is that they are often hand truck model-specific.

Therefore, they are ordinarily only capable of properly securing a specific model of hand truck. Hand trucks which are dimensioned differently from the designated hand truck model generally cannot be supported adequately.

For instance, one approach is to provide a device which lockably secures the individual arms of the hand truck into lockable engagement with the hand truck holder. Typical of such an apparatus is set forth in U.S. Pat. No. 3,443,730 to Meusel. In this patent, latching blades are provided on a mounting frame which contains openings dimensioned to cradle the individual hand truck arms. A pivotal mechanism is used to lockably engage the arms, thereby cradling them.

However, if it were desired to use another hand truck which, perhaps, included arms having a larger diameter or were spaced apart in a manner different from that of the designated model, a new hand truck holder which could accommodate the changes would be necessary. Meusel cannot universally accommodate a variety of hand truck designs.

Moreover, the locking mechanism of Meusel is directed more toward the prevention of theft rather than convenience. Thus, this locking mechanism is rather complex, difficult to use and laborious to assembly. In addition, the locking mechanism protrudes beyond the rear side of the mounting frame which requires a rearward clearance necessary to allow latching blades to pivot about unimpaired.

While the prior devices have been satisfactory for many applications, there has been a need for providing a hand truck holder capable of universal mounting to a plurality of delivery vehicles. Moreover, it is highly desirable to provide a device which is capable of releasably securing a plurality of different hand truck designs.

Accordingly, it is an object of the present invention to provide a hand truck holder apparatus and method which may be mounted to a variety of delivery vehicle models.

It is another object of the present invention to provide a hand truck holder which is capable of mounting a plurality of hand truck designs thereon.

It is a further object of the present invention to provide a hand truck holder device which is durable, compact, easy to maintain, has a minimum number of components and is economical to manufacture.

The apparatus and method of the present invention has other objects and features of advantage which will become apparent from and are set forth in more detail in the description of the Best Mode of Carrying Out the Invention and the accompanying drawing.

SUMMARY OF THE INVENTION

The present invention includes a hand truck holder for releasably securing a hand truck to a vehicle bumper. The hand truck holder of the present invention comprises, briefly, a bracket member including a mounting plate and a pair of flanges positioned on opposed sides of the mounting plate. A mounting means is coupled to the bracket member for mounting the same to the vehicle. A support member transversely mounted to the pair of flanges supports the hand truck thereon. Finally, a substantially resilient securing strap is mounted to and transversely spans the bracket member, thereby securing the hand truck to the bracket member.

In another aspect, the present invention provides a hand truck holder for releasably securing a hand truck having a lift platform to a vehicle bumper. This aspect of the present invention comprises a bracket member including a mounting plate defining a plurality of sets of apertures extending therethrough for releasably mounting the bracket member to a plurality of vertical mounting positions relative to the bumper. Each mounting aperature within individual sets of mounting apertures is laterally spaced apart by a distance substantially equal a lateral spacing between license aperatures of to a standard license plate mounting pattern. A support member transversely mounted to the bracket member supports the lift platform thereon. Securing means are means mounted to opposite sides of the bracket member for securing the hand truck to the bracket member.

In still another aspect of the present invention, a method for mounting a hand truck holder having a mounting plate to a vehicle bumper is provided including the steps of removing an existing license plate from the vehicle bumper which has at least one set of laterally spaced apart license apertures corresponding to a standard license plate bolt pattern, positioning the hand truck holder against the vehicle bumper in a substantially upright position, vertically aligning at least one set of laterally spaced apart mounting apertures with at least one set of the license apertures. The mounting apertures being laterally spaced apart by a distance substantially equal to the distance between each license aperture in the set of license apertures. Finally, vertically aligning the hand truck holder with respect to the vehicle such that when the hand truck holder is mounted to the bumper, the vehicle may operate in a normal unimpeded manner.

Accordingly, the present invention simplifies the mounting of a hand truck to a hand truck holder by providing a bracket whereby a substantially resilient strap is mounted thereto which adaptably conforms to numerous hand truck designs for releasably securement. Further, the present invention permits mounting of the hand truck holder to a vehicle bumper along a plurality of vertical positions by providing a plurality of sets of laterally spaced apart apertures which correspond to a standard license plate pattern.

BRIEF DESCRIPTION OF THE DRAWINGS

FIG. 1 is an exploded, front perspective view of the hand truck holder device designed in accordance with the present invention and mounted to the front bumper of a delivery vehicle.

FIG. 2 is an enlarged, bottom perspective plan view of a presently preferred embodiment of the hand truck holder shown in FIG. 1.

FIG. 3 is an enlarged side elevational view, in cross section, of the present invention.

DETAILED DESCRIPTION OF THE PREFERRED EMBODIMENT

Reference will now be made in detail to the preferred embodiments of the invention. While the present invention has been described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

It will be noted here that for a better understanding, like components are designated by like reference numerals throughout the various figures. Attention is directed to FIG. 1, where the subject hand truck holder, generally designated 40 is illustrated. In the preferred embodiment, a hand truck holder 40 is generally positioned vertically to receive a hand truck, generally designated 20. Hand truck 20, shown in FIG. 1, illustrates a general all purpose hand truck for convenience. As will be more apparent below, numerous hand truck designs and shapes may be used in conjunction with the present invention. The illustrated hand truck 20 comprises a frame 22 having two substantially parallel arms 24. A lifting platform 26 is positioned proximate the distal ends of arms 24 and is generally perpendicular to arms 24. Wheels or casters 28 are similarly positioned proximate the distal ends of arms 24.

To engage hand truck 20 with the holder designed in accordance with the present invention, briefly, lifting platform 26 of hand truck 20, is inserted a substantially into a slot 42 until frame arms 24 abut against holder 40. As viewed in FIGS. 1 and 3, the bottom side of lift platform 26 rests and is supported by a support member 44 of holder 40. In the preferred form, a strap, generally designated 46, is provided to releasably secure hand truck 20 against the hand truck holder 40. Thus, securement and removal of the hand truck 20 is a very simple procedure. In contrast to the prior art, the hand truck holder of the present invention can accommodate a variety of hand truck holder designs and dimensions. Moreover, the present invention is rather mechanically uncomplex, easy to assemble and efficient to use.

In the preferred embodiment, a bracket member 48 includes a substantially planar mounting plate 50. Disposed substantially along opposed sides of mounting plate 50, as can be viewed in FIG. 2, is a first flange 52 and a mirror-image second flange 54 each having corresponding lip portions 56 and 58, respectively. Preferably, flanges 52 and 54 each are positioned perpendicular to the mounting plate 50 and define receiving notches 60 and 62 which will be discussed in greater detail below. It will be appreciated that mounting plate 50 could just as easily comprise a frame member (not shown) of similar dimension having cross members (discussed below).

Bracket member 48 is preferably metal and may be constructed from a single sheet. Any relatively rigid material, however, may be used without departing from the true spirit of the invention. Flanges 52 and 54 may be formed simply by bending the edges of metal sheet to a position perpendicular to mounting plate 50. Accordingly, bracket member 48 is extremely easy to fabricate.

Positioned proximate a bottom edge 64 of mounting plate 50 is the support member 44 having a substantially planar ledge portion 66 which transversely spans opposed flanges 52 and 54. In the preferred form, ledge portion 66 is spaced apart from and positioned perpendicularly to both bracket member 48, and flanges 52 and 54. Opposed suspension brackets 68 and 70, as seen in FIG. 2 coupled to the opposite ends of ledge 66, are rigidly mounted to flanges 52 and 54, respectively. Suspension brackets 68 and 70 suspend ledge portion 66 away bracket member 48 defining slot 42 therebetween. As previously mentioned and as shown in FIG. 3, lift platform 26 of hand truck 20 is inserted into slot 42 wherein support member 44 vertically supports hand truck 20 at lift platform 26. Furthermore, as FIGS. 2 and 3 illustrate, a rearwardly extending lip member 72 is provided extending from the bottom edge 64. Lip member provides additional support for lift platform 26 should, for some reason, the resilient strap 46 fail.

In accordance with the present invention, a substantially resilient strap 46 comprises the securement means for releasably securing the hand truck 20 against the hand truck holder 40. Preferably, strap 46 is composed of a material such as rubber which has elastic properties. FIG. 1 shows strap 46 in a relaxed, nontensioned position (shown in broken lines). Disposed on one distal end of strap 46 is a mounting member 74 which fixedly couples strap 46 to at least one flange 52 or 54. For convenience, it will be designated that mounting member 74 shall be fixedly mounted to flange 52.

Preferably, mounting member 74 permits pivotal movement about an axis substantially parallel to the elongated axis of flange 52 such that strap 46 may be positioned in a direction traverse to both flanges 52 and 54. Receiving notches 60 and 62 are positioned proximate transversely spanning strap 46 so that it may be positioned therethrough to provide lateral support. It will be appreciated that notches 60 and 62 are dimensioned to slidably receive the corresponding portions of strap 46. Accordingly, receiving notches 60 and 62 dissuade lateral movement of strap 46 relative to flanges 52 and 54 while strap 46 is tensioned therethrough.

A retaining member 76 is disposed proximate the remaining distal end of resilient strap 46 for releasably retaining strap 46 through corresponding receiving notch 62. As best viewed in FIG. 3, retaining member 76 is dimensioned larger than corresponding notch 62 such that retaining member 76 cannot be slidably positioned through notch 62. However, it will be appreciated that both ends could just as easily be releasable or include two retaining members 76 at opposite ends without departing from the scope of the present invention.

In a relaxed position, as shown in broken lines in FIG. 1, strap 46 preferably is not long enough to span the entire transverse distance between flanges 52 and 54. Thus, strap 46 and retaining member 76 must be stretched beyond respective flange 54 to be tautly positioned through corresponding receiving notch 62.

Therefore, to mount hand truck 20 in an upright position to the holder 40 of the present invention, the lifting platform 26 must be aligned with and position through slot 42 until arms 24 abut mounting platform 50. Subsequently, resilient strap 46 is pivotally swung around the backside of the frame 22. Retaining member 76 is then stretched beyond flange 54 and corresponding lip portion 58, whereby strap 46 may then be inserted into corresponding notch 62. Stretched resilient strap 46 will partially recoil, drawing retaining member 76 against a outer side wall of flange 54. Moreover, the underside of lip portion 58 further wedges retaining member 76 in slot 62 such that strap 46 is secured across mounting plate 50. In this configuration, strap 46 engages frame 22 to securably retain hand truck 20 against holder 40.

To release hand truck 20, a pulling force must be exerted in the longitudinal direction of resilient strap 46 to move retaining member 76 beyond the lip portion 58. This permits strap 46 to disengage from notch 62, thereby allowing removal of hand truck 20.

In the preferred embodiment, retaining member 76 includes a T-shaped handle 78 which aids manual gripping of retaining member 76. T-shaped handles are old in the field and are not claimed as a novel aspect of the present invention. Strap 46 is preferably a heavy duty rubber strap of the type used by O.E.M. vehicle manufacturers for hood latches or battery box covers. In addition, both mounting member 74 and retaining member 76 may be integrated into resilient strap 46. Therefore, strap 46, mounting member 74 and retaining member 76 may be fabricated from one unitary molded piece. This functionally simple retaining structure is much more efficient and easier to use and assemble than the prior art mounting systems which include a variety of chain, clasps or other more complex mechanisms.

Accordingly, as is apparent, the securement means designed in accordance with the present invention permits a variety of hand truck frames having different designs to be placed between mounting plate 50 and resilient strap 46. In contrast, the prior art hand truckholders are ordinarily only designed to hold a specific hand truck model.

In another aspect of the present invention, a mounting means includes a plurality of sets of mounting apertures 80 extending through mounting plate 50, as can be seen in FIGS. 1 and 2. Sets of apertures 80 allow hand truck holder 40 to be releasably mounted to a vehicle 30. Preferably, hand truck holder 40 is mounted in an upstanding, substantially vertical, position to a vehicle bumper 32 as can be clearly viewed in FIGS. 1 and 3. In the preferred form, the respective mounting apertures contained within an individual set of mounting apertures are positioned in the same horizontal plane. Moreover, each set of apertures 80 is positioned at differing vertical heights and is preferably centrally aligned on mounting plate 50 in a fashion parallel to both flanges 52 and 54. Accordingly, the plurality vertically mounted sets of apertures 80 allow bracket member 48 to be releasably mounted to a plurality of vertical mounting positions along the bumper 32.

In the preferred embodiment, each respective mounting aperture within individual sets of apertures 80 are laterally spaced apart by a distance substantially equal to the lateral spacing between each license apertures within a set of mounting apertures 82 of a standard license plate pattern. This is clearly illustrated by laterally spaced holes 82 of the license plate pattern shown in FIG. 1. For the purposes of the present invention, the definition of "standard license plate pattern" shall refer to the standardized mounting pattern used by the majority of car manufacturers for mounting a license plate. It will be appreciated, however, that some jurisdictions incorporate different standardized license plate patterns for that particular jurisdiction. For example, European countries incorporate a standardized license plate pattern substantially different from that employed in the United States. It will be noted that the present invention may be easily adapted to a specific jurisdiction.

Therefore, according to the present invention, at least one set of apertures 80 is formed to align with the laterally spaced holes 82 of existing standardized license plate mounting holes. FIG. 1, however, illustrates holder 40 mounted to bumper 32 by two sets of apertures 80 corresponding to both standardized laterally spaced holes 82 of the license plate. It will be appreciated that only one set of apertures 80 extending through mounting plate 50 need be used without departing from the true spirit of the present invention. Moreover, if only one set of apertures 80 can be aligned with laterally spaced holes 82, mounting plate 50 may act as a template whereby two or more additional holes may be drilled through bumper using a different set of apertures 80.

As mentioned, the hand truck holder 40 of the present invention affords the freedom to mount it along a plurality of vertical positions relative to bumper 32. Therefore, hand truck holder 40 may be adaptably mounted to numerous delivery vehicle models. The prior art hand truck holders were generally vehicle model-specific because clearance problems between the hand truck holders and the vehicle parts often prevented interchangeability. The present invention, however, permits hand truck holder 40 to be vertically positioned such that when hand truck holder 40 is mounted to the vehicle bumper 32, the vehicle 30 may be operated in a substantially unimpeded manner.

The means for mounting plate 50 is to bumper 32 not only includes apertures 80, but bolts 84 as well. As best viewed in FIG. 3, a set of corresponding spacers 86 may be provided between bumper 32 and mounting plate 50. Spacers 86 act as an isolatory means so that mounting plate 50 will not contact bumper 32. Moreover, spacers 82 allow hand truck holder 40 to be adjusted to a substantially vertical position if the face of bumper 32 is not itself substantially vertical. It will be appreciated, however, that mounting plate 32 could just as easily have been mounted flush against bumper 32 without departing from the true spirit of the present invention.

Additionally, the method of mounting the hand truck holder 40 to vehicle bumper 32 includes removing the existing license plate from the front or rear bumper 32. The license plate may then be remounted to the right or left side of the bumper 32. Bracket member 48 is then positioned vertically upright against bumper 32, wherein at least one set of aperatures 80 is aligned with at least one corresponding set of standardized license plate apertures 82. Bracket member 48 is then vertically positioned with respect to vehicle bumper 32 to ensure that there is clearance between the top edge of bracket member 48 and all vehicle parts, such as the hood.

After the hand truck holder 40 is properly vertically positioned, at least one other set of aperatures 80 may be used as a template to drill additionally holes corresponding to the other set of apertures 80 in mounting plate 50 in bumper 32. Lastly, to ensure proper isolation from bumper 32 and, more importantly, to ensure proper vertical positioning of bracket member 48, spacers 86 may be placed between bumper 32 and mounting plate 50.

Although the mounting description substantially references mounting to the front bumper 32, it will be appreciated that a rear bumper mount, using the hand truck holder 40 as a template, could just as easily be accomplished in a manner similar to that of the front bumper mount. Moreover, it will further be appreciated that the hand truck holder 40 of the present invention may be mounted to almost any substantially planar surface by using additional bracketry or spacers. For example, mounting to a rear bulk head mount or an interior compartment mount can be accommodated.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims.

Therefore, persons of ordinary skill in this field are to understand that all such equivalent structures are to be included within the scope of the following claims:

What is claimed is:

1. A hand truck holder for releasably securing to a vehicle a hand truck having a lift platform, the hand truck holder comprising:
   a bracket member including a mounting plate and a pair of flanges positioned on opposed sides of said mounting plate;
   mounting means for mounting said bracket member to the vehicle;
   a support member transversely mounted to said pair of flanges for supporting the hand truck thereon and positioned below a bottom edge of said mounting plate defining a receiving slot therebetween, said receiving slot being dimensioned to receive the lift platform therethrough; and
   a substantially resilient securing strap mounted to and transversely spanning said bracket member for securing the hand truck to said bracket member.

2. The hand truck holder as defined in claim 1 wherein,
   said strap includes a retaining means mounted to at least one distal end of said strap for releasably coupling said one end to said bracket member.

3. The hand truck holder as defined in claim 2 wherein,
   each of said pair of flanges defines a strap slot dimensioned to receive therethrough a portion of said strap.

4. The hand truck holder as defined in claim 1 wherein,
   said mounting means includes a plurality of sets of mounting apertures extending through said mounting plate for releasably mounting said bracket member at a plurality of vertical mounting positions along a vertical direction relative to the bumper.

5. The hand truck holder as defined in claim 4 wherein,
   each mounting aperture within each individual set of mounting apertures are laterally spaced apart by a distance substantially equal to a lateral spacing between license plate mounting apertures of a standard license plate mounting pattern for mounting therethrough.

6. The hand truck holder as defined in claim 1 wherein,
   said bottom edge includes a rearwardly extending lip member.

7. A hand truck holder for releasably securing to a vehicle bumper a hand truck having a lift platform, the hand truck holder comprising:
   a bracket member including a mounting plate defining a plurality of sets of apertures extending therethrough for releasably mounting said bracket member at a plurality of vertical mounting positions along a vertical direction relative to the bumper, each mounting aperture within each individual set of mounting apertures being laterally spaced apart by a distance substantially equal to a lateral spacing between license plate mounting apertures of a standard license plate mounting pattern for mounting therethrough,
   a support member transversely mounted to said bracket member for supporting the lift platform thereon, said support member being positioned below a bottom edge of said mounting plate defining a receiving slot therebetween for receiving the lift platform therethrough; and
   securing means mounted to opposite sides of said bracket member for securing the hand truck to said bracket member.

8. The hand truck holder as defined in claim 7 wherein,
   said bracket member includes a pair of flanges positioned on opposed sides of said mounting plate, said securing means being mounted thereon.

9. The hand truck holder as defined in claim 8 wherein,
   said securing means comprises a substantially resilient strap.

10. The hand truck holder as defined in claim 9 wherein,
said strap includes a retaining means mounted to at least one distal end of said strap for releasably coupling said one end to said bracket member.

11. The hand truck holder as defined in claim 10 wherein,
each of said pair of flanges include a strap slot for receiving therethrough a portion of said strap.

12. A hand truck holder for releasably securing to a vehicle a hand truck having a lift platform, the hand truck holder comprising:
a bracket member including a mounting plate and a pair of flanges positioned on opposed sides of said mounting plate;
mounting means for mounting said bracket member to the vehicle and including a plurality of sets of mounting apertures extending through said mounting plate for releasably mounting said bracket member to a plurality of vertical mounting positions relative to the bumper, each mounting aperture within each individual set of mounting apertures being laterally spaced apart by a distance substantially equal a lateral spacing between license apertures of a standard license plate mounting pattern;
a support member transversely mounted to said pair of flanges for supporting the hand truck thereon and positioned below a bottom edge of said mounting plate defining a receiving slot therebetween such that the lift platform is received therethrough; and
a substantially resilient securing strap mounted to and transversely spanning said bracket member for securing the hand truck to said bracket member, said strap includes a retaining means mounted to at least one distal end of said strap for releasably coupling said one end to said bracket member, each of said pair of flanges defines a strap slot dimensioned to receive therethrough a portion of said strap.

* * * * *